(12) United States Patent
Sheng et al.

(10) Patent No.: US 10,791,082 B2
(45) Date of Patent: Sep. 29, 2020

(54) SYSTEMS AND METHODS FOR DELIVERY AND USE OF INTERACTIVE OBJECTS

(71) Applicant: D8AI Inc., Taipei (TW)

(72) Inventors: Richard Li-Cheng Sheng, Davis, CA (US); Hui Hsiung, Pasadena, CA (US)

(73) Assignee: D8AI Inc., Taipei (TW)

( * ) Notice: Subject to any disclaimer, the term of this patent is extended or adjusted under 35 U.S.C. 154(b) by 340 days.

(21) Appl. No.: 15/818,761

(22) Filed: Nov. 21, 2017

(65) Prior Publication Data
US 2019/0158444 A1    May 23, 2019

(51) Int. Cl.
| | | |
|---|---|---|
| G06F 15/16 | (2006.01) | |
| H04L 12/58 | (2006.01) | |
| H04L 29/06 | (2006.01) | |
| G06N 20/00 | (2019.01) | |

(52) U.S. Cl.
CPC .............. *H04L 51/18* (2013.01); *H04L 51/04* (2013.01); *G06N 20/00* (2019.01); *H04L 67/42* (2013.01)

(58) Field of Classification Search
CPC ......... H04L 51/04; H04L 51/18; H04L 67/42; G06N 20/00
See application file for complete search history.

(56) References Cited

U.S. PATENT DOCUMENTS

| | | | |
|---|---|---|---|
| 8,909,725 B1 | 12/2014 | Sehn | |
| 9,237,202 B1 | 1/2016 | Sehn | |
| 9,407,712 B1 | 8/2016 | Sehn | |
| 2007/0288247 A1* | 12/2007 | Mackay | G06Q 10/00 705/1.1 |
| 2011/0252108 A1* | 10/2011 | Morris | H04L 51/32 709/206 |
| 2013/0061158 A1* | 3/2013 | Leacock | H04L 12/1827 715/757 |
| 2013/0127850 A1* | 5/2013 | Bindon | G06T 19/20 345/420 |
| 2014/0304335 A1* | 10/2014 | Fung | H04L 67/38 709/204 |
| 2015/0067754 A1* | 3/2015 | Wiser | H04N 21/2668 725/120 |

(Continued)

FOREIGN PATENT DOCUMENTS

| | | |
|---|---|---|
| TW | M529206 U | 9/2016 |
| TW | M549381 U | 9/2017 |

*Primary Examiner* — Jonathan A Bui
(74) *Attorney, Agent, or Firm* — Winston Hsu

(57) ABSTRACT

A server and a number of client devices are connected via a network. Interactive objects are initiated in one of the client devices and delivered to any number of other client devices over the network. Real-time interactions between the object sender and the object receiver(s) can then be engaged using event-triggering mechanisms built into the client devices and applied onto the objects, and be coordinated by a coordinating module in the server. The interactive objects may carry instructions for event-triggered loading, activating and execution of functional widgets, such as workflows or collaborations, stored in the same server or elsewhere on the network. Once loaded in a client device, a widget needs not to be reloaded upon further use. Furthermore, the coordinating module may be linked to a machine-learning module in the same server or elsewhere on the network.

16 Claims, 6 Drawing Sheets

(56) References Cited

U.S. PATENT DOCUMENTS

| | | | |
|---|---|---|---|
| 2015/0286958 A1* | 10/2015 | Liu | G09B 5/125 |
| | | | 705/326 |
| 2016/0269330 A1* | 9/2016 | McEvoy | H04L 51/18 |
| 2017/0290504 A1* | 10/2017 | Khaderi | A61B 3/0091 |
| 2018/0137244 A1* | 5/2018 | Sorenson | A61B 8/565 |
| 2018/0367480 A1* | 12/2018 | Housman | G06N 5/02 |
| 2019/0087049 A1* | 3/2019 | Mani | G06F 3/0346 |
| 2019/0325359 A1* | 10/2019 | Flinn | G06Q 10/0633 |
| 2019/0377461 A1* | 12/2019 | Akhanov | G06F 3/0485 |
| 2020/0162534 A1* | 5/2020 | Mehta | H04L 65/601 |
| 2020/0169933 A1* | 5/2020 | Gay | H04W 36/36 |

\* cited by examiner

SYSTEMS AND METHODS FOR DELIVERY AND USE OF INTERACTIVE OBJECTS

BACKGROUND OF THE INVENTION

1. Field of the Invention

The subject matter disclosed herein relates generally to network communications, social media, and instant messaging. Particularly, the present disclosure describes network-implemented systems and methods for delivery and use of interactive objects that allow real-time interactions between the object sender and the object receiver(s) on the network.

2. Description of the Prior Art

The omnipresent networks (particularly the Internet) have made network communications daily events, and one of the most pervasive forms of network communications is instant messaging. Traditionally, objects (messages) delivered over networks are pure content such as texts, pictures, or videos—they are "static". Although static objects can be used for time-sequential interactions between the object sender and the object receiver, they could not be used as a means of real-time interactions. Furthermore, once a static object is sent, the sender normally loses control over the object. Exceptions are ephemeral messages delivered on networks (see U.S. Pat. No. 8,909,725 filed on Mar. 7, 2014, U.S. Pat. No. 9,237,202 filed on Oct. 8, 2014, and U.S. Pat. No. 9,407,712 filed on Dec. 21, 2015); these messages are automatically deleted after a specified viewing period, a specified number of views, or a specified period of time. Nevertheless, other than setting conditions for the message deletion, neither the sender nor the receiver could use the message itself as an object for real-time interactions.

More recently in several instant messaging applications (e.g. Messenger, WeChat, LINE), messages are used to carry instructions to activate widgets (mini applications) built into the messaging applications. However, the objects (messages) themselves remain static.

SUMMARY OF THE INVENTION

The present disclosure describes network-implemented systems and methods including a server and a number of client devices (e.g. smartphones, tablets, computers) on a network (e.g. Internet), wherein interactive objects can be initiated in one of the client devices and be delivered to any number of other client devices over the network. Real-time interactions between the object sender and the object receiver(s) can then be engaged using event-triggering mechanisms built into the client devices and applied onto the objects, and be coordinated by a coordinating module in the server.

The interactive objects may carry instructions for event-triggered loading, activating and execution of functional widgets, such as workflows or collaborations, stored in the same server or elsewhere on the network. Once loaded in a client device, a widget needs not to be reloaded upon further use.

Furthermore, the coordinating module may be linked to a machine-learning module in the same server or elsewhere on the network. In addition to coordinating interactive tasks among interacting client devices, the coordinating module may collect data associated with the interacting parties and the interactive tasks, send the data to the machine-learning module for analysis, and modify behaviors of subsequent interactions among interacting parties based on the analysis.

These and other objectives of the present invention will no doubt become obvious to those of ordinary skill in the art after reading the following detailed description of the preferred embodiment that is illustrated in the various figures and drawings.

DETAILED DESCRIPTION

The scope of the present invention is defined by the claims appended to the following detailed description, while the embodiments described herein serve as illustrations, not limitations, of the claims.

Figure 1:
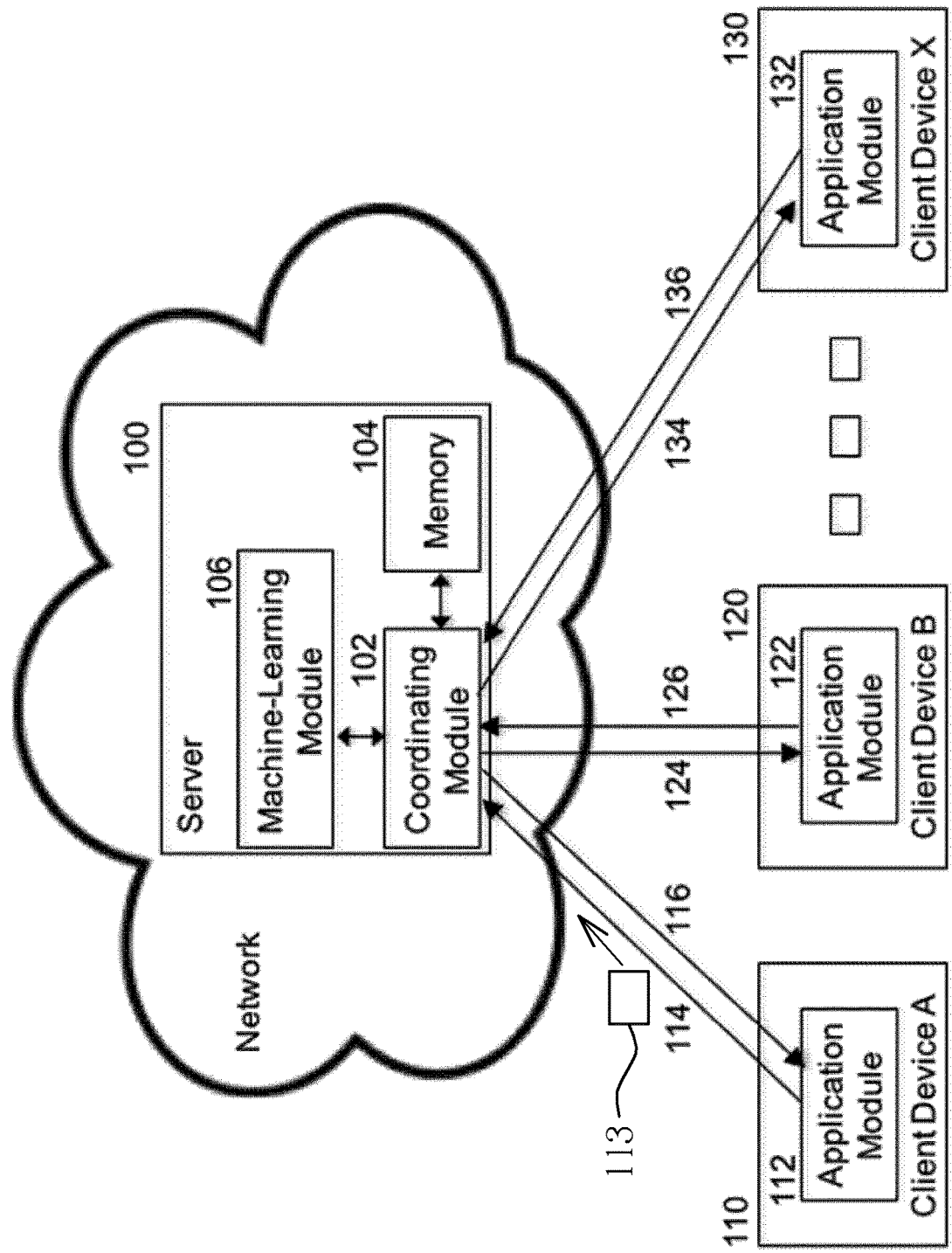
FIG. 1 is a block diagram showing a network system configured to deliver interactive objects among multiple client devices via a server consistent with some embodiments.

FIG. 1 is a block diagram showing a network system configured to deliver interactive objects among multiple client devices via a server consistent with some embodiments. The server 100 and the client devices 110, 120, 130 are remotely connected through the network, which may be the Internet or a local-area network. The server 100 contains a coordinating module 102, a memory module 104, and optionally a machine-learning module 106. In similar embodiments, the memory module or the machine-learning module may be located in another remote server on the network. Examples of the client devices are smartphones, tablet computers, notebook computers, desktop computers, or other computing devices. Each client device contains an application module 112, 122, 132 in which interactive objects can be initiated, sent, received, and interacted with by the device user. One example of the application module is instant messaging software.

The interactive objects may contain texts, images, animations, videos, or other multimedia. Each interactive object may carry states that define the object's visual, audible and lifetime attributes in each client device, and an object's states—along with its associated attributes, may or may not be identical for each client device, and can be caused to change by an event-triggering mechanism. A client device typically contains a display and a speaker such that visual and audible attributes of interactive objects can be displayed and heard. The event-triggering mechanisms may involve haptic contacts of a touch sensor, computer-mouse operations, hand gestures, or voice commands that are linked with interactive objects via software. The client devices typically contain one or more input elements such as touch sensor, mouse, keyboard, touch pad, camera, or microphone, for the user to apply the event-triggers. Examples of the interactive objects include e-gifts or e-pets that exhibit visual and audible attributes resembling that of gifts' or pets'.

Any one of the client devices (hereinafter referred as "sender") can initiate a new interactive object and deliver it to one or more designated client devices (hereinafter referred as "receivers") via the coordinating module 102 of the server 100. In response, any one or more of the receivers can apply an event trigger onto the object to engage in a real-time interaction session with the sender.

To illustrate this, consider client device A 110 as the sender and client device B 120 as the receiver. A new object 113 is initiated in the application module 112 of client device A, delivered via network path 114 to the coordinating module 102, and forwarded via network path 124 to the application module 122 of client device B. At the moment when an event trigger is applied onto the object 113 in the application module 122 of client device B, a response is delivered via network path 126 to the coordinating module 102, and forwarded via network path 116 back to the application module 112 of client device A. Subsequent real-time interactions between client device A and client device B can be conducted using a sequence of event triggers applied onto the object 113 within the two client devices, respectively. In the same manner, real-time interactions can be carried out among the object sender and more than one object receivers. The multi-device interactive process is coordinated by the coordinating module 102 of the server.

An existing interactive object can be deleted from all interacting client devices by the object sender with a predefined event-triggering mechanism. In some embodiments, the interactive objects are ephemeral and are automatically deleted from all interacting client devices after a specified viewing period, a specified number of views, a specified period of time, or after completion of a preset series of interactive tasks.

In some embodiments, the interactive objects can carry instructions for loading, activating and execution of functional widgets (mini applications), such as workflows or collaborations, stored in a memory module 104 residing in the same server, or remotely on the network, and once loaded in a client device, a widget needs not to be reloaded upon further use. In such an embodiment, the real-time interactions among multiple client devices typically involve executing functions of the widget. Examples of the functional widgets include e-form widgets, through which the sender and the receiver(s) can share and change content of an e-form, such as an ordering menu or a voting ballot, in real time. Another example of the functional widget is an e-whiteboard widget, through which the sender and the receiver(s) can share and change displayable images in real time.

In another type of embodiments, the coordinating module 102 is linked to a machine-learning module 106 in the same server 100, or remotely on the network, and the coordinating module 102 can collect data associated with the interacting parties and the interactive tasks, send the data to the machine-learning module 106 for analysis, and modify behaviors of subsequent interactions among interacting parties based on the analysis.

Figure 2:
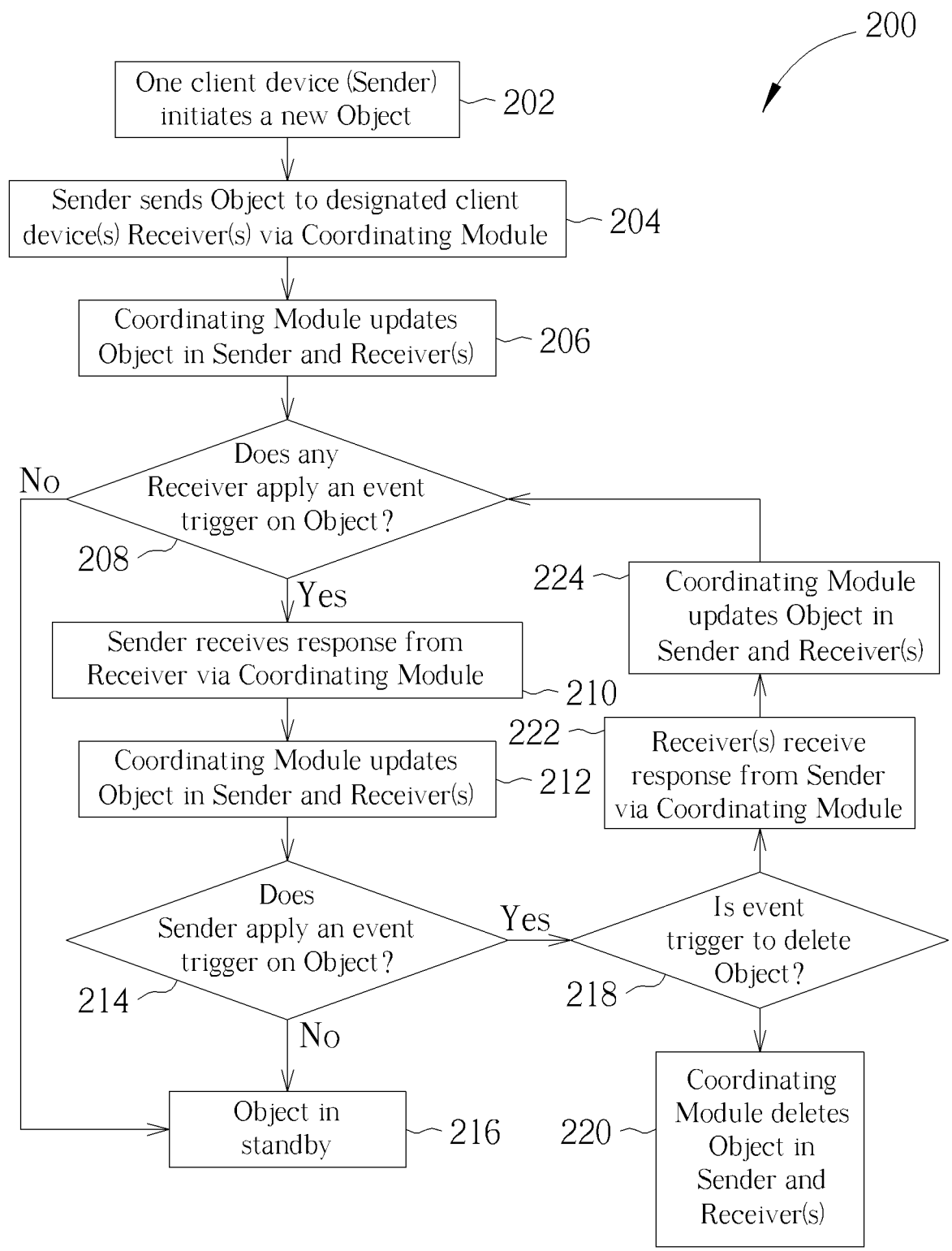
FIG. 2 is a flowchart showing a network method including initiation, delivery, and deletion of an interactive object, as well as event-triggered real-time interactions between the object sender and object receiver(s) consistent with some embodiments.

FIG. 2 is a flowchart showing a network method including initiation, delivery, and deletion of an interactive object, as well as event-triggered real-time interactions between the object sender and object receiver(s) consistent with some embodiments. Flowchart 200 is to illustrate one of many variations of the process consistent with claims of the present invention. In operation 202, one of the client devices (herein referred as "sender") initiates a new interactive object, and in operation 204, the sender sends the object to one or more client devices designated by the sender (herein referred as "receivers") via the coordinating module 102. In operation 206, the coordinating module updates the status of the object in the sender and the receivers, and the visual and audible attributes of the object in individual devices will reflect such a status updating. One of the receivers who apply an event trigger onto the object normally initiates operation 208; otherwise, the object remains in a standby mode 216. At the moment when any receiver initiates an event trigger, operation 210 takes place and the sender will receive a real-time response via the coordinating module 102 (with a latency determined by the speed of the network delivery and the software processing). In operation 212, the coordinating module 102 immediately updates the status of the object in the sender and the receivers. Multiple receivers may initiate operations 208 to 210 at different times. The sender who applies an event trigger onto the object typically initiates operation 214; otherwise, the object remains in its standby mode 216. In operation 218, various situations may influence the type of event triggered by the sender. The sender may choose to delete the object in all the interacting client devices 220, or he/she may continue the real-time interaction with the receivers by triggering an appropriate event that leads to operations 222 and 224, mirroring operations 210 and 212. Operations 208 through 224 may be repeated as needed.

Figure 3A:
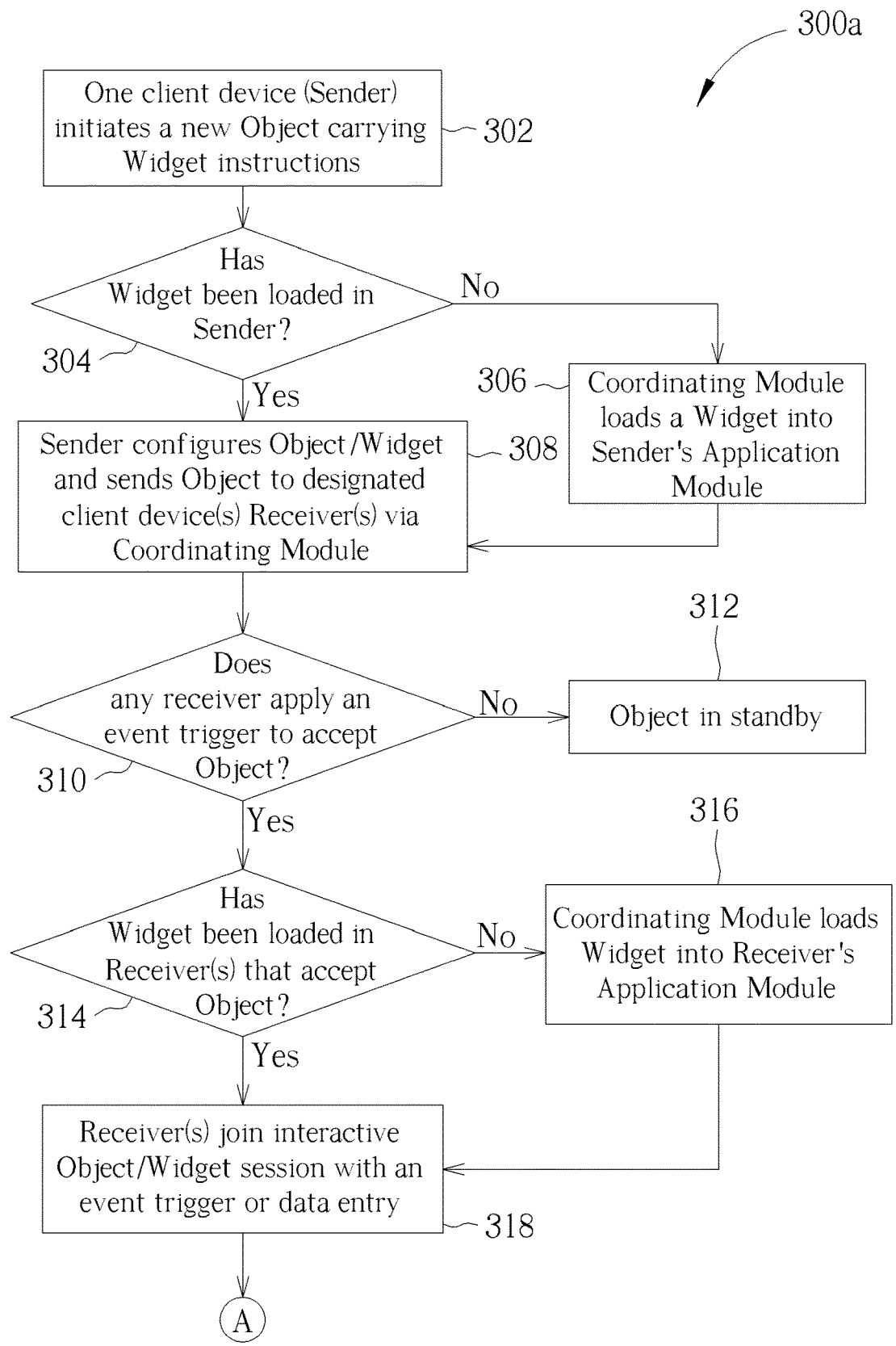
FIG. 3A is a flowchart showing a network method including initiation, delivery, and deletion of an interactive object that carries widget instructions, as well as event-triggered loading of the widget code and real-time interactions between the object sender and object receiver(s) consistent with some embodiments.
Figure 3B:
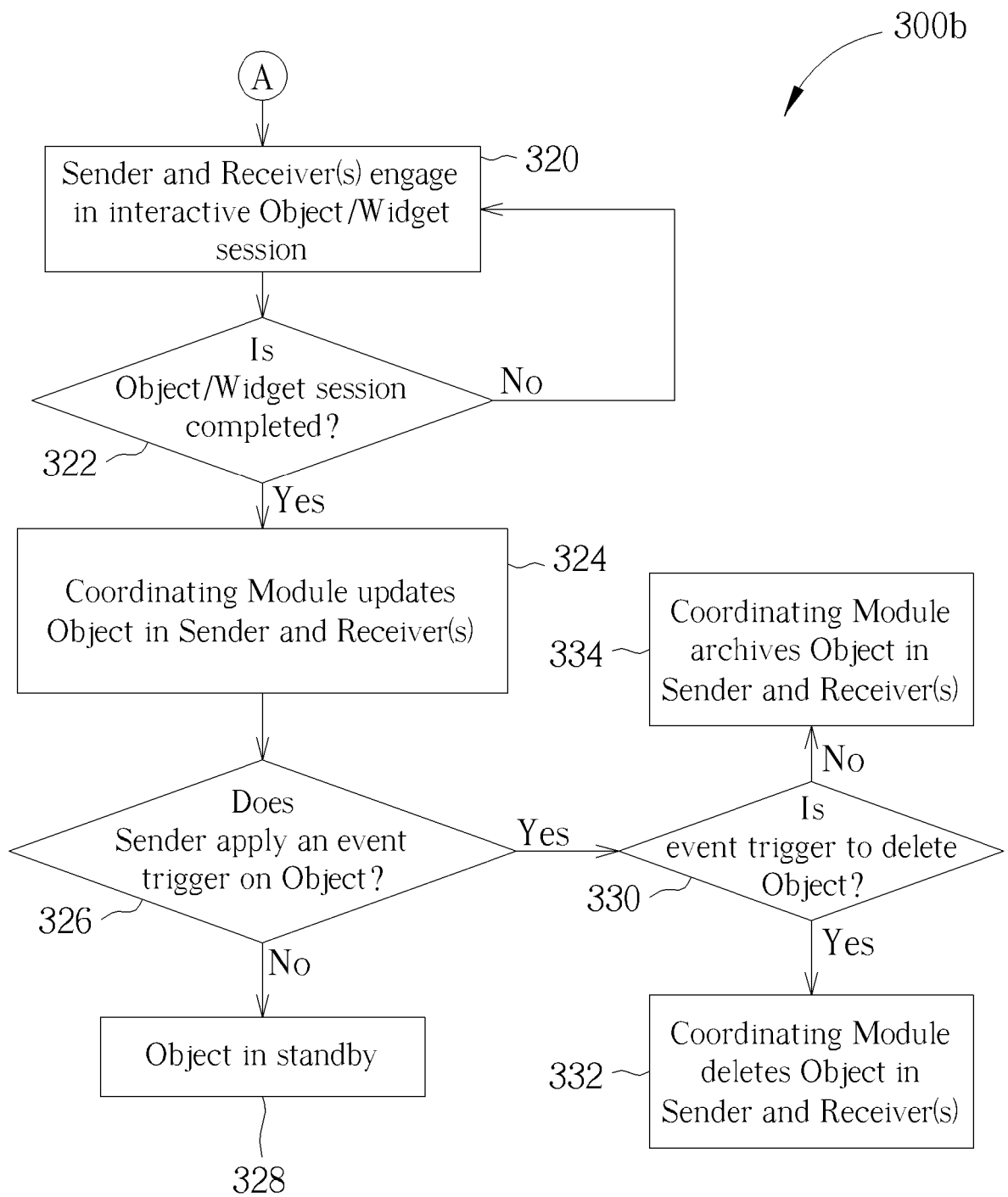
FIG. 3B is a continuation of the flowchart of FIG. 3A.

FIGS. 3A and 3B are flowcharts 300A, 300B showing a network method including initiation, delivery, and deletion of an interactive object that carries widget instructions, as well as event-triggered loading of the widget code and real-time interactions between the object sender and object receiver(s) consistent with some embodiments. Flowcharts 300A, 300B are to illustrate one of many variations of the process consistent with claims of the present invention. In operation 302, one of the client devices (herein referred as "sender") initiates a new interactive object that carries widget instructions. In operation 304, the application module 112, 122, or 132 of the sender determines if the widget code has already been loaded in the sender device 110, 120, or 130—if not, operation 306 is automatically carried out wherein the coordinating module 102 will load the widget code, stored in the memory module 104 residing in the same server or remotely on the network, into the sender device 110, 120, or 130. In operation 308, once the widget code has been loaded, the sender configures the widget instructions carried by the object and sends the object to one or more client devices designated by the sender (herein referred as "receivers") via the coordinating module 102. Operation 310 is initiated by one of the receivers who applies an event trigger onto the object to indicate his/her acceptance of the object; otherwise, the object remains in a standby mode 312. In operation 314, the application module of the accepting receiver determines if the widget code has already been loaded in the receiver device—if not, operation 316 is automatically carried out wherein the coordinating module 102 will load the widget code stored in the memory module 104 into the receiver device. In operation 318, once the widget code has been loaded, the receiver joins the real-time interaction session involving the widget by either applying an event trigger onto the object or entering relevant data associated with the widget. Operations 310 to 318 may be initiated by multiple receivers. In operation 320, the sender and the receiver(s) engage in a real-time interaction session that carries out the widget's functions. In operation 322, the coordinating module of the server determines if the real-time interaction session has been completed, and if this is confirmed, operation 324 is carried out, wherein the coordinating module updates the status of the object in the sender and the receivers, and the visual and audible attributes of the object in each interacting device will reflect such a status updating. The sender who applies an event trigger onto the object typically initiates operation 326; otherwise, the object remains in its standby mode 328. In operation 330, various situations may influence the type of event triggered by the sender. The sender may choose to delete the object in all the interacting client devices 332, or he/she may choose to archive the object along with results of the interactive widget session 334. Operations 326 through 334 are optional.

Figure 4:
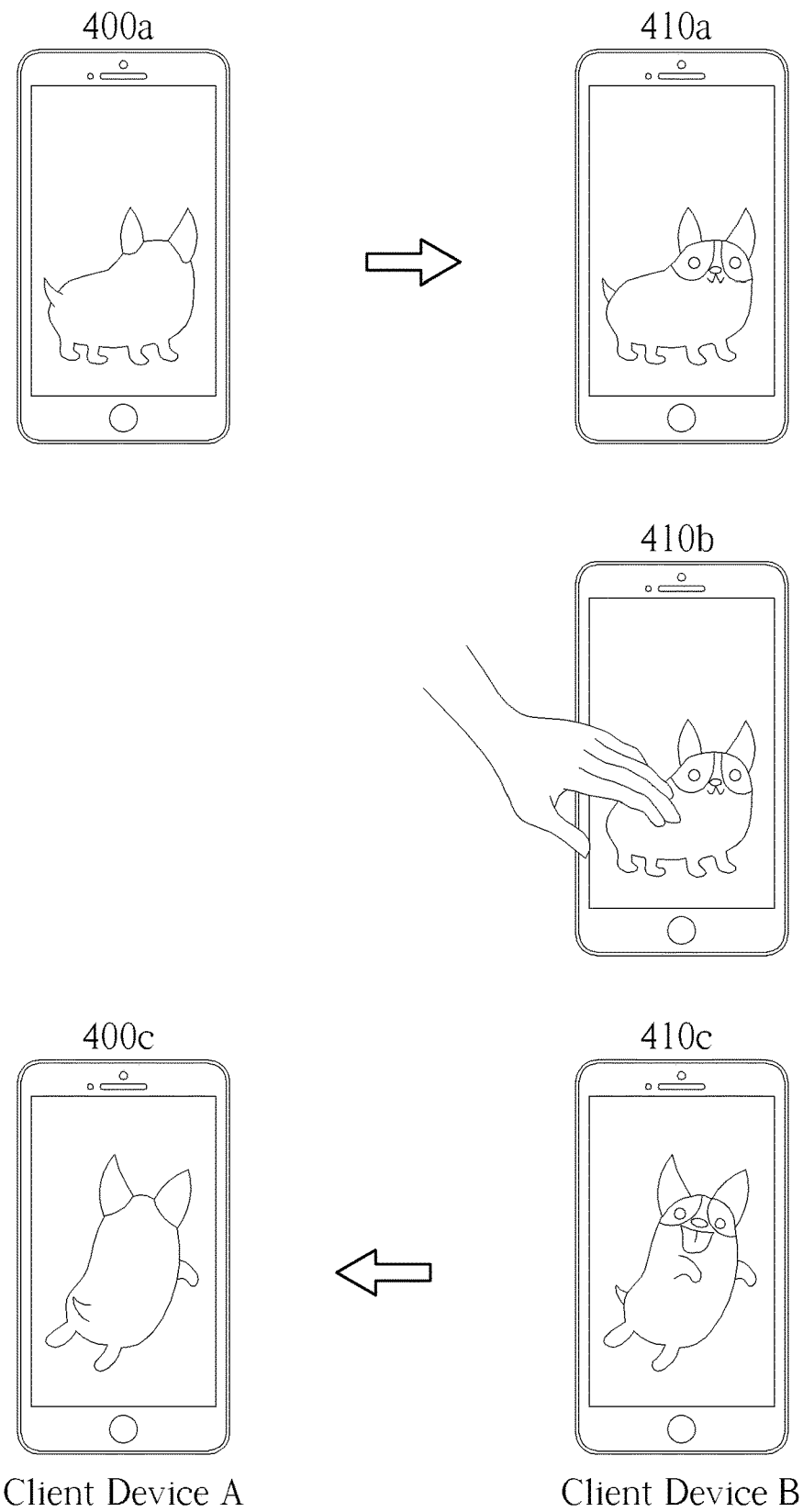
FIG. 4 illustrates one embodiment wherein a real-time interaction between two client devices is carried out using an e-pet as the interactive object.

FIG. 4 illustrates one embodiment wherein a real-time interaction between client device A and client device B is carried out using an e-pet as the interactive object as an example. Herein both client devices are equipped with a display and a touch sensor overlapping the display. First, an e-pet is initiated in client device A 400*a*, and delivered to client device B 410*a*. As soon as the user of client device B caresses the e-pet on the display, hence activating an event triggered by the haptic contact 410*b*, the e-pet reacts with motions and sounds that reflect its new visual and audible attributes 410*c*, and such changes are simultaneously shown on client device A 400*c*. Notice that in this illustration, the two client devices exhibit different visual attributes for the same object.

Figure 5:
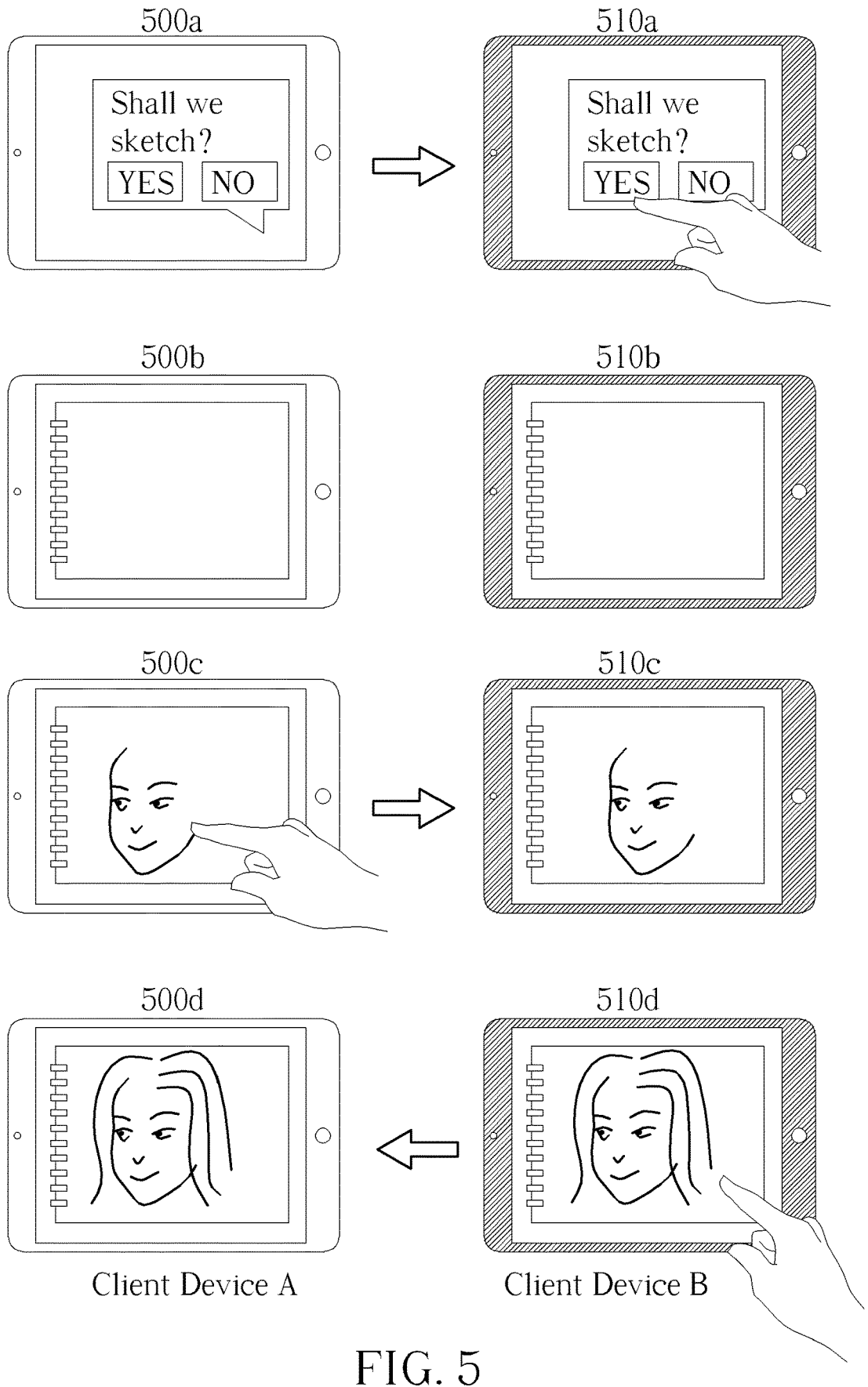
FIG. 5 illustrates another embodiment wherein a real-time interaction between two client devices is carried out using an interactive object to activate an e-whiteboard widget.

FIG. 5 illustrates another embodiment wherein a real-time interaction between client device A and client device B is carried out using an interactive object that carries instructions for an e-whiteboard widget. Herein both client devices are equipped with a display and a touch sensor overlapping the display. Firstly, an object carrying e-whiteboard invitation is initiated in client device A 500*a*, and delivered to client device B. Once the user of client device B accepts the invitation by touching the "Yes" button as in 510*a*, an e-whiteboard is activated on both client devices 500*b* & 510*b*. When the user of client device A draws on the e-whiteboard 500*c*, the drawing in progress simultaneously appears on client device B 510*c*. The user of client device B can also draw on his/her device 510*d* and the result shows up on client device A in real time 500*d*.

Furthermore, the present disclosure is different from real-time, interactive online games in that interactive functionalities are loaded and activated one by one only when they are needed according to how users act on the objects, in contrast to typical online games wherein all functionalities are preloaded altogether—whether used or not. Unlike online games where all functionalities are designed for the game objectives, the present disclosure may provide a spectrum of object-activated functionalities for a broad range of productive or entertaining objectives.

The present disclosure, which may be implemented in hardware, software, or a combination thereof, provides systems and methods for delivery and use of non-static, reactive objects that allow real-time interactions between the object sender and the object receivers on the network. An advantage that the present disclosure provides is a means of real-time online communication that is more efficient, as well as more versatile, than prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network implemented system for delivery and use of interactive objects, comprising:
 a server and a multiple of client devices connected through a network, wherein interactive objects can be initiated in one of the client devices and delivered over the network to one or multiple other client devices;
 one or more event-triggering mechanisms implemented in the client devices that are applied onto said objects for triggering real-time interactions between a sender of an object and receiver(s) of the object, where "interactions" are at least one triggering response being sent back to the sender of the object by a receiver of the object; and
 a coordinating module in the server that can coordinate said real-time interactions, wherein said coordinating module is linked to a machine-learning module in the same server or remotely on the network, and the coordinating module collects data associated with the sender and the receiver(s) of the object and the interactions, sends the data to the machine-learning module for analysis, and modifies behaviors of subsequent interactions among the interacting parties based on the analysis.

2. The network implemented system for delivery and use of interactive objects of claim 1, wherein said network is the Internet or a local area network.

3. The network implemented system for delivery and use of interactive objects of claim 1, wherein said client devices are at least one of smartphones, tablet computers, notebook computers, desktop computers, and other computing devices.

4. The network implemented system for delivery and use of interactive objects of claim 1, wherein said interactive objects comprise at least one of texts, images, animations, videos, and other multimedia.

5. The network implemented system for delivery and use of interactive objects of claim 1, wherein said interactive objects are delivered over the network via an instant messaging application.

6. The network implemented system for delivery and use of interactive objects of claim 1, wherein said event-triggering mechanisms are at least one of haptic contacts of a touch sensor, computer-mouse operations, hand gestures, and voice commends that are linked with said interactive objects via software.

7. The network implemented system for delivery and use of interactive objects of claim 1, wherein a said object is deleted from all interacting client devices by a said event-triggering mechanism.

8. The network implemented system for delivery and use of interactive objects of claim 1, wherein said objects are ephemeral and are automatically deleted from all interacting client devices after a specified viewing period, a specified number of views, a specified period of time, or after completion of a preset series of interactive tasks.

9. The network implemented system for delivery and use of interactive objects of claim 1, wherein a said object in each interacting client device is caused to change its visual and audible attributes by a said event-triggering mechanism.

10. The network implemented system for delivery and use of interactive objects of claim 1, wherein each said object carries states that define the object's visual, audible and lifetime attributes in each said client device, and an object's states along with its associated attributes, may or may not be identical for each client device, and are changed by a said event-triggering mechanism.

11. The network implemented system for delivery and use of interactive objects of claim 1, wherein said objects carry instructions for loading, activating and execution of functional widgets including workflows or collaborations, stored in a memory module in the server, or remotely on the network, and once loaded in a client device, a widget needs not to be reloaded upon further use.

12. The network implemented system for delivery and use of interactive objects of claim 1, wherein at least two of the multiple client devices exhibit different visual attributes for the same object.

13. The network implemented system for delivery and use of interactive objects of claim 1, wherein said object exhibits visual and audible attributes as an e-gift or an e-pet, through which the sender and the receiver(s) can interact with one another in real time.

14. The network implemented system for delivery and use of interactive objects of claim 1, wherein said interactive object carries instructions of an e-form widget, through which the sender and the receiver(s) can share and change content of an e-form in real time.

15. The network implemented system for delivery and use of interactive objects of claim 14, wherein said e-form widget is an ordering menu or a voting ballot.

16. The network implemented system for delivery and use of interactive objects of claim 1, wherein said interactive object carries instructions of an e-whiteboard widget, through which the sender and the receiver(s) can share and change displayable images in real time.

* * * * *